United States Patent [19]

Stock

[11] 3,955,535

[45] May 11, 1976

[54] AUTOMATIC SAFETY SWITCH

[76] Inventor: Erwald E. Stock, Rte. 3, Box 121, Manitowoc, Wis. 54220

[22] Filed: Jan. 20, 1975

[21] Appl. No.: 542,417

[52] U.S. Cl. ............................................. 119/27
[51] Int. Cl.² .......................................... A01K 29/00
[58] Field of Search ................................. 119/27

[56] References Cited
UNITED STATES PATENTS

| | | | |
|---|---|---|---|
| 2,779,309 | 1/1957 | Myer et al. | 119/27 |
| 3,043,266 | 7/1962 | Olscheske | 119/27 |

*Primary Examiner*—Hugh R. Chamblee
*Attorney, Agent, or Firm*—Clarence A. O'Brien; Harvey B. Jacobson

[57] ABSTRACT

A safety switch for use with a cow trainer has a frame in the form of a sleeve constructed from an electrically insulating material. Slits provided in one end of the sleeve receives a plate portion of an electrically conductive clamp which is engageable with an electrically conductive overhead wire. The clamp is intermittently engaged by a cow trainer supporting electrically conductive contact element slidably mounted on the sleeve and supporting a cow trainer. By proper positioning of a contact bar of the cow trainer over the back of a cow, the cow will contact the bar and will move the contact element into engagement with the clamp whenever the cow humps its back.

11 Claims, 9 Drawing Figures

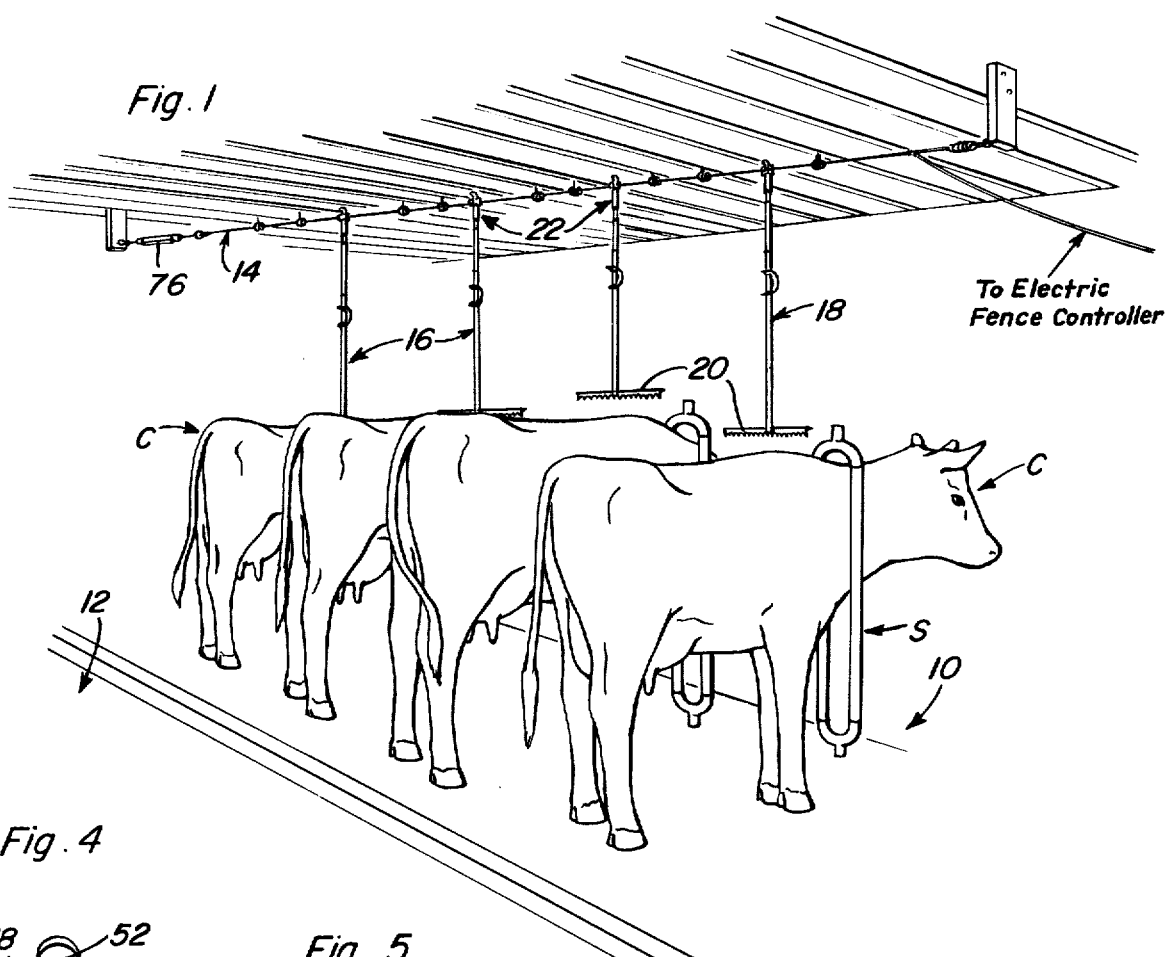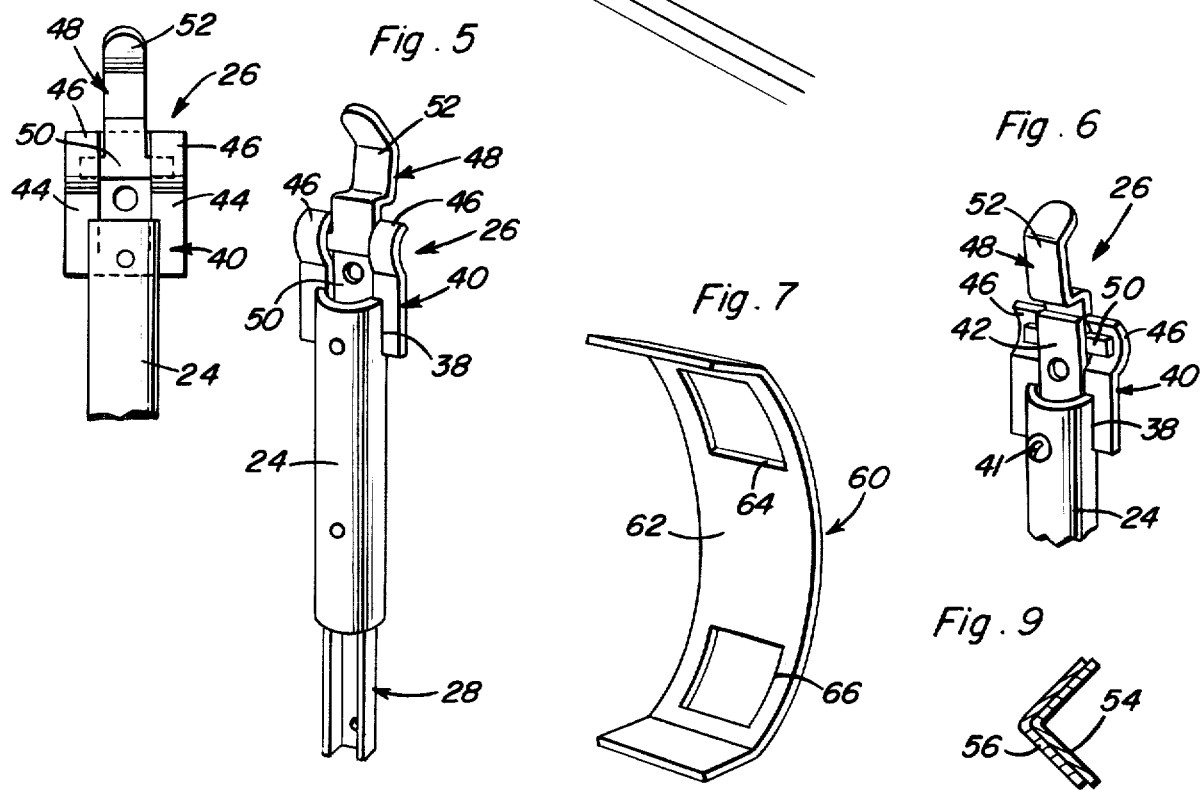

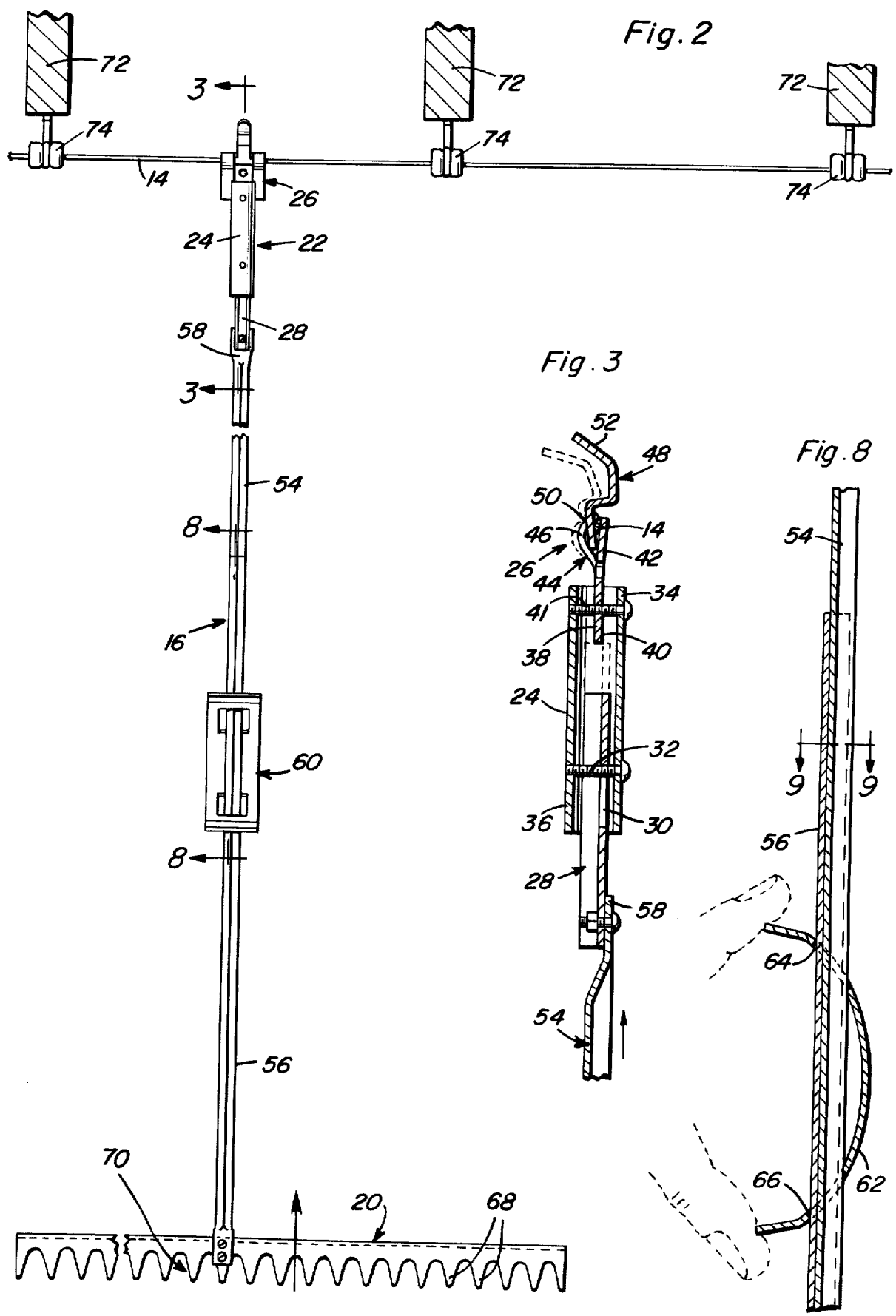

AUTOMATIC SAFETY SWITCH

BACKGROUND OF THE INVENTION

1. Field of the Invention

This invention relates generally to a safety switch, and particularly to a safety switch for use with cow trainers and similar electrical systems.

2. Description of the Prior Art

It is known generally to employ what is commonly referred to as a "cow trainer" to prevent cows, and the like, from humping their backs when they are disposing of their waste. Such devices have been found desirable to use because the conventional dairy-barn arrangement has dairy cows retained in a specific relationship with respect to a trough or a gutter that runs along a row of stalls. Stanchions are usually provided at each stall for so retaining the cows. If, however, the cows hump their backs and move their back legs forward when disposing of their waste, the waste will fall onto the floor of the stall and not into the trough or gutter, and the cow will inevitably become soiled.

The conventional arrangement of these animal training devices has an electrically conducting wire strung over the animal's stall. Electrically conductive devices, which form the cow trainers, are suspended from this electrically conductive wire and adjusted so as to be a few inches above the back of the animal so that the animal will only be shocked when the animal humps its back. Examples of prior art devices of this kind may be found in U.S. Pat. Nos. 2,428,875, issued Oct. 14, 1947 to J. J. Hantz, U.S. Pat. No. 3,370,570, issued Feb. 27, 1968 to O. M. Treangen, U.S. Pat. No. 3,832,976, issued Sept. 3, 1974 to P. M. Sands, and U.S. Pat. No. 2,790,416, issued Apr. 30, 1957 to A. F. Klinzing.

A problem commonly encountered with prior art animal trainers of the kind discussed above, however, is that the trainer itself is connected directly to the overhead live wire. As can be readily appreciated, this direct connection means that the training device is constantly energized, with resulting safety hazards to farmers and other persons working around the animal's stall.

SUMMARY OF THE INVENTION

It is an object of the present invention to provide an automatic safety switch specifically suited for connecting a cow trainer, and the like, to a live overhead wire.

It is another object of the present invention to provide an automatic safety switch which eliminates accidental shock hazards in conventional cow trainer systems.

It is still another object of the present invention to provide a safety switch that may be employed with existing cow trainer systems.

These and other objects are achieved according to the present invention by providing a safety switch having; a frame; a clamp mounted on the frame for engaging an electrically conductive wire; and a contact element slidably mounted on the frame for movement toward and away from the clamp and connectible to an electrical device, such as a cow trainer, for supporting the device and being nominally pulled away from the clamp by the weight of the device. Preferably, the frame is a sleeve constructed from an electrically insulating material, and the clamp and contact element are constructed from electrically conducting material.

The contact element advantageously extends longitudinally and is arranged within the sleeve. Further, the contact element is advantageously provided with a longitudinal slot which cooperates with a pin disposed extending into the sleeve transversely thereof for limiting movement of the contact element relative to the sleeve.

A preferred clamp according to the present invention includes a plate inserted into slits provided in one end of the sleeve. A leaf spring is provided on the plate, with the latter being further provided with cantilevers arranged bracketing the leaf spring and terminating in arcuate portions. A clamp element having a "T" portion is disposed between the leaf spring and the arcuate portions for being biased into a position retaining a wire engaged between the clamp element and the arcuate portions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragramentary, perspective view showing a portion of a cow barn provided with cow trainers suspended by switches according to the present invention.

FIG. 2 is a fragmentary, sectional view taken generally along the lines 2—2 of FIG. 1.

FIG. 3 is a fragmentary, sectional view taken generally along the line 3—3 of FIG. 2.

FIG. 4 is a fragmentary, elevational view showing a safety switch according to the present invention.

FIG. 5 is a perspective view showing the safety switch of FIG. 4.

FIG. 6 is a fragmentary, perspective view showing the safety switch of FIGS. 4 and 5, but from the opposite side thereof.

FIG. 7 is a perspective view showing a spring clip used for adjusting the shaft of a cow trainer which may be employed with a safety swtich according to the present invention.

FIG. 8 is a fragmentary, sectional view taken generally along the line 8—8 of FIG. 2.

FIG. 9 is a sectional view taken generally along the line 9—9 of FIG. 8, but with the spring clip removed.

DESCRIPTION OF THE PREFERRED EMBODIMENT

Referring now more particularly to FIG. 1 of the drawings, a portion of a cow barn is illustrated, wherein a plurality of stalls 10 are associated with a gutter 12 as is conventional. An overhead electrically conductive wire 14 is arranged above stalls 10, as is also conventional. Further, wire 14 may be energized as by a conventional electric fence controller (not shown) which is usually standard equipment around dairy farms. A cow trainer 16 having a shaft 18 and a contact bar 20 mounted on an end of the shaft 18 and arranged substantially perpendicular to the shaft 18 is connected to wire 14, and supported therefrom, as by a safety switch 22 according to the present invention. It will be appreciated that while a specific cow trainer is disclosed and described herein, any conventional cow trainer can be adapted for use with a safety switch 22.

Turning now more particularly to FIGS. 2–6 of the drawings, safety switch 22 advantageously includes a frame in the form of a generally cylindrical sleeve 24 constructed from a conventional electrically insulating material, such as polyvinyl chloride. Mounted on sleeve 24 is a clamp 26 arranged for engaging wire 14, and a contact element 28 slidable relative to sleeve 24 for movement to and away from clamp 26 and connectible to cow trainer 16 for nominally being pulled away from clamp 26 by the weight of trainer 16. As can be readily seen from the drawings, contact element 28 extends longitudinally within sleeve 24, and is provided with a slot 30, also extending longitudinally, which cooperates with a pin 32 disposed extending into sleeve 24 transversely to sleeve 24 for permitting limited movement of contact element 28 relative to sleeve 24. The conventional screw shown in FIG. 3 can be employed as pin 32 if so desired.

Sleeve 24 has spaced ends 34 and 36, and is provided in end 34 with opposed, substantially coplanar slits 38. Clamp 26 includes a plate 40 inserted into slits 38 and retainable in the slits 38 as by the conventional screw 41 shown in FIGS. 3 and 6 of the drawings. Clamp 26 also includes a leaf spring 42 provided on plate 40, with the latter being further provided with cantilevers 44 arranged bracketing spring 42 and terminating in arcuate portions 46. As perhaps can best be seen from FIG. 3, arcuate portions 46 curve away from leaf spring 42. That is, portions 46 are convex relative to the plane of leaf spring 42. A clamp element 48 having a T portion 50 is disposed between leaf spring 42 and arcuate portions 46 for being biased into a position retaining wire 14 engaged between clamp element 48 and arcuate portions 46. Clamp element 48 further has a handle 52 arranged for facilitating a pivotal movement of the cross bar of portion 50 within arcuate portions 46 to permit leaf spring 42 to be biased away from arcute portions 46 and facilitate insertion of wire 14 into clamp 26.

FIGS. 7-9 show a form of which shaft 18 of cow trainer 16 may be advantageously, but not necessarily, constructed. As illustrated, cow trainer 16 has a shaft 18 contructed from a pair of cooperating lengths of angles 54 and 56, with one end of angle 54 being formed as a flat 58 (FIG. 3) which facilitates attachment of angle 54 to contact element 28 as by the illustrated screw fastener. A clip 60 advantageously in the form of a substantially C-shaped member 62 constructed from a suitable, known springy material, such as spring steel, is provided with a pair of spaced windows 64 and 66 in which angles 54 and 56 are retentively disposed. As is shown in FIG. 8, the spaced ends of member 62 may be manually engaged and brought toward one another in order to release angles 54 and 56 and adjust the length of the shaft formed by the angles 54 and 56. In this manner, the height of contact bar 20 above the back of a cow C (FIG. 1) can be adjusted to a predetermined desired height. A placement of the contact bar 20 of a cow trainer 16 three to four inches above the shoulder of a cow C and eighteen inches from the stanchion row S (FIG. 1) is suggested for optimum results. Switch 22, however, need only have a throw, or length of slot 30, of, for example, 3/8ths of an inch, as this is about the distance a humping cow will displace a properly positioned cow trainer 16.

As perhaps can best be seen from FIG. 2 of the drawings, contact bar 20 is advantageously provided with a plurality of rake-forming teeth 68 along the edge 70 of bar 20 arranged fartherest from switch 22 and wire 14. The sharp prongs formed by teeth 68 will facilitate use of the contact bar 20 with cow C having heavy hair.

Still referring to FIG. 2 of the drawings, if the cow barn is provided with conventional ceiling studs 72, wire 14 may be suspended above stalls 10 as by the conventional insulators 74. A turnbuckle 76 (FIG. 1) and the like may be employed for keeping the wire 14 taut under the weight of the switches 22 and cow trainer 16. Since, however, the mounting of overhead wire 14, and the energizing of same by an electric fence controller, are features which are known per se and do not form part of the present invention, they will not be discussed in greater detail herein.

As will be readily appreciated from the above description and from the drawings, the use of a safety switch according to the present invention will eliminate unexpected shocks commonly encountered with conventional cow trainer systems. These unexpected shocks can cause burns, and the like, and can even bring on heart attacks to persons so susceptible. Further, switch 22 facilitates attachment of a cow trainer 16 to an overhead wire 14, since the clamp 26 of switch 22 may be left open over the wire until the trainer is properly positioned, and then the clamp 26 closed in order to retain the trainer in the desired position. Of course, switch 22 would be clamped onto a wire 14 when same is deenergized. Once in position, cow trainer 16 will not be energized until contact element 28 is pushed upwardly toward clamp 26 a distance of, for example, 3/8ths of an inch.

In order to enhance the inherent reliability and low maintenance of a switch 22 according to the present invention, clamp 26 may be electric plated material, fabricated in a conventional manner, which will not rust, and the inside channel shaped contact element 28 can be stainless steel, electric plated material, or other material that is electrically inductive and will not rust so as to always make contact.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A safety switch for use with cow trainer, the switch comprising, in combination:
   a. a frame;
   b. clamp means mounted on the frame for engaging an electrically conductive wire; and
   c. contact means slidably mounted on the frame for movement toward and away from the clamp means and connectible to a device to be energized for being normally pulled away from the clamp means by the device and breaking contact between the contact means and the clamp means; and the frame is a sleeve constructed from an electrically insulating material, the clamp means and contact means being constructed from an electrically conducting material; and the contact means including a longitudinally extending contact element arranged within the sleeve, the contact element being provided with a longitudinal slot, and a pin disposed extending into the sleeve transversely thereof and engaging in the slot for permitting limited movement of the contact element relative to the sleeve.

2. A structure as defined in claim 1, wherein the sleeve has spaced ends, and is provided with opposed, substantially coplanar slits in one of the spaced ends, the clamp means including a plate inserted into the slits, the leaf spring provided on the plate, with the latter being further provided with cantilevers bracketing the leaf spring and terminating in arcuate portions, and the clamp element havint a T portion disposed between the leaf spring and the arcuate portions for being biased into a position retaining a wire engaged between the clamp element and arcuate portions.

3. In combination with a stall and a gutter, an overhead electrically conductive wire above the stall, and a cow trainer having a shaft and a contact bar mounted on an end of the shaft and arranged substantially perpendicular to the shaft, a safety switch, comprising, in combination:
  a. a frame;
  b. clamp means mounted on the frame for engaging the overhead electrically conductive wire and supporting the switch from the wire; and
  c. contact means slidably mounted on the frame for movement toward and away from the clamp means and connected to the shaft of the cow trainer for energizing the cow trainer and supporting same from the switch and the electrically conductive wire; and the shaft is constructed from a pair of cooperating lengths of angles and a clip in the form of a substantially C-shaped member constructed from a springy material and provided with a pair of spaced windows in which the angles are retentively, and releasably, disposed.

4. A structure as defined in claim 3, wherein the frame is a sleeve constructed from an electrically insulating material, the clamp means and contact means being constructed from an electrically conducting material.

5. A structure as defined in claim 3, wherein the contact bar of the cow trainer is provided with a plurality of teeth along an edge thereof arranged furthest from the safety switch and the overhead electrically conductive wire.

6. In combination with a stall and a gutter, an overhead electrically conductive wire above the stall, and a cow trainer having a shaft and a contact bar mounted on an end of the shaft and arranged substantially perpendicular to the shaft, a safety switch, comprising, in combination:
  a. a frame;
  b. clamp means mounted on the frame for engaging the overhead electrically conductive wire and supporting the switch from the wire; and
  c. contact means slidably mounted on the frame for movement toward and away from the clamp means and connected to the shaft of the cow trainer for energizing the cow trainer and supporting same from the switch and the electrically conductive wire; and the frame is a sleeve constructed from an electrically insulating material, the clamp means and contact means being constructed from an electrically conducting material; and the contact means including a longitudinally extending contact element arranged within the sleeve, the contact element being provided with a longitudinal slot, and a pin disposed extending into the sleeve transversely thereof and engaging in the slot for permitting limited movement of the contact element relative to the sleeve.

7. A structure as defined in claim 6, wherein the sleeve has spaced ends and is provided with opposed, substantially coplanar slits in one of the spaced ends, the clamp means including a plate inserted into the slits, a leaf spring provided on the plate with the latter being further provided with cantilevers bracketing the leaf spring and terminating in arcuate portions, and a clamp element having a T portion disposed between the leaf spring and the arcuate portions for being biased into a position retaining the overhead electrically conductive wire arranged between the clamp element and arcuate portions.

8. A structure as defined in claim 7, wherein the shaft is constructed from a pair of cooperating lengths of angles and a clip in the form of a substantially C-shaped member constructed from a springy material and provided with a pair of spaced windows in which the angles are retentively, and releasably, disposed.

9. A structure as defined in claim 8, wherein the contact bar of the cow trainer is provided with a plurality of teeth along an edge thereof arranged furthest from the safety switch and the overhead electrically conductive wire.

10. In combination with a stall and a gutter, an overhead electrically conductive wire above the stall, and a cow trainer having a shaft and a contact bar mounted on an end of the shaft and arranged substantially perpendicular to the shaft, a safety switch, comprising, in combinaton:
  a. a frame;
  b. clamp means mounted on the frame for engaging the overhead electrically conductive wire and supporting the switch from the wire; and
  c. contact means slidably mounted on the frame for movement toward and away from the clamp means and connected to the shaft of the cow trainer for energizing the cow trainer and supporting same from the switch and the electricconductive wire; and the contact means including a longitudinally extending contact element arranged on the frame, the contact element being provided with a longitudinal slot, and a pin disposed extending from the frame engaging in the slot for permitting limited movement of the contact element relative to the frame and clamp means.

11. In combination with a stall and a gutter, an overhead electrically conductive wire above the stall, and a cow trainer having a shaft and a contact bar mounted on an end of the shaft and arranged substantially perpendicular to the shaft, a safety switch, comprising, in combination:
  a. a frame;
  b. clamp means mounted on the frame for engaging the overhead electrically conductive wire and supporting the switch from the wire; and
  c. contact means slidably mounted on the frame for movement toward and away from the clamp means and connected to the shaft of the cow trainer for energizing the cow trainer and supporting same from the switch and the electrically conductive wire; and the frame is in the form of a sleeve having spaced ends and provided with opposed, substantially coplanar slits in one of the spaced ends, the clamp means including a plate inserted into the slits, a leaf spring provided on the plate, with the latter being further provided with cantilevers bracketing the spring and terminating in arcuate portions, and a clamp element having a T portion disposed between the leaf spring and the arcuate portions for being biased into a position including a wire engaged between the clamp element and arcuate portions.

* * * * *